United States Patent
Mahendra et al.

(10) Patent No.: US 12,445,172 B2
(45) Date of Patent: Oct. 14, 2025

(54) BEAMLOCK ON A PLURALITY OF ANTENNA ARRAYS

(71) Applicant: Nokia Technologies Oy, Espoo (FI)

(72) Inventors: Rachit Mahendra, Bangalore (IN); Smita Shetty, Bangalore (IN); Christian Rom, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 14 days.

(21) Appl. No.: 18/654,761

(22) Filed: May 3, 2024

(65) Prior Publication Data
US 2024/0388331 A1    Nov. 21, 2024

(30) Foreign Application Priority Data

May 19, 2023   (IN) .............................. 202341035126

(51) Int. Cl.
*H04B 7/04* (2017.01)
*H04B 7/0408* (2017.01)

(52) U.S. Cl.
CPC ................. *H04B 7/0408* (2013.01)

(58) Field of Classification Search
CPC ... H04B 7/0408; H04B 7/0691; H04B 7/0695
USPC ........................................ 375/267, 297, 299
See application file for complete search history.

(56) References Cited

U.S. PATENT DOCUMENTS

| | | | |
|---|---|---|---|
| 9,318,794 B2 | 4/2016 | Chang et al. | |
| 10,707,976 B1 * | 7/2020 | Derat ..................... | H04B 17/12 |
| 2016/0381596 A1 * | 12/2016 | Hu ..................... | H04W 28/0268 370/236 |
| 2017/0155439 A1 * | 6/2017 | Chang .................. | H01Q 1/1257 |
| 2021/0041522 A1 | 2/2021 | Manolakos et al. | |
| 2023/0261766 A1 * | 8/2023 | Li ......................... | H04W 52/42 370/252 |

OTHER PUBLICATIONS

Extended European Search Report received for corresponding European Patent Application No. 24165968.9, dated Nov. 4, 2024, 10 pages.
Discussion on the addition of UE beamlock function in 38.509 and its scope, 3GPP TSG-RAN WG5 Meeting #77, R5-176996, Agenda: 5.3.20.15, Keysight Technologies, Nov. 27-Dec. 1, 2017, 4 pages.
"On extensions to the UE beam locking conformance testing function", 3GPP TSG-RAN WG5 Meeting #1-5G-NR Adhoc, R5-180040, Agenda: 4.1.7, Fraunhofer HHI, Jan. 16-19, 2018, pp. 1-8.
"3rd Generation Partnership Project; Technical Specification Group Radio Access Network; 5GS; Special conformance testing functions for User Equipment (UE) (Release 17)", 3GPP TS 38.509, V17.3.0, Mar. 2023, pp. 1-68.

(Continued)

*Primary Examiner* — Emmanuel Bayard
(74) *Attorney, Agent, or Firm* — Lippes Mathias LLP

(57) ABSTRACT

Example embodiments of the present disclosure relate to apparatuses, methods, and computer readable storage medium for beamlock on a plurality of antenna arrays. In a method, a first apparatus receives a beamlock message from a second apparatus. The beamlock message indicates that one or more transmitting beams are to be locked on a first list of antenna arrays and/or one or more receiving beams are to be locked on a second list of antenna arrays. Based on the beamlock message, the first apparatus performs beamlock of the one or more transmitting beams and/or the one or more receiving beams.

20 Claims, 7 Drawing Sheets

(56) References Cited

OTHER PUBLICATIONS

"3rd Generation Partnership Project; Technical Specification Group Radio Access Network; 5GS; User Equipment (UE) conformance specification; Part 1: Common test environment (Release 17)", 3GPP TS 38.508-1, V17.8.0, Mar. 2023, pp. 1-1463.
"WF for FR2 OTA test enhancement SI", 3GPP TSG-RAN WG4 Meeting # 106, R4-2302923, Agenda: 9.5.4, Qualcomm Incorporated, Feb. 27-Mar. 3, 2023, 11 pages.
"WF on UE demodulation and CSI requirements for FR2 multi-Rx DL reception", 3GPP TSG-RAN WG4 Meeting #106-bis-e, R4-2306000, Agenda: 5.8.4, Qualcomm, Apr. 17-26, 2023, 6 pages.
"WF on FR2 multi-Rx", 3GPP TSG-RAN WG4 Meeting # 105, R4-2220533, Agenda: 8.8.4, Apple, Nov. 14-18, 2022, 4 pages.
"WF on FR2-1 UERF requirements for FR2 multi-Rx", 3GPP TSG-RAN WG4 Meeting # 106bis-e, R4-2306604, Agenda: 5.8.2.1, vivo, Apr. 17-26, 2023, 6 pages.
"Enhancement of UE beamlock test function command for multi-TRP connection", 3GPP TSG-RAN4 #106, R4-2300763, Agenda: 9.5.2, Anritsu, Feb. 27-Mar. 3, 2023, pp. 1-3.
"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.
"IEEE 802.11", Wikipedia, Retrieved on May 25, 2024, Webpage available at : https://en.wikipedia.org/wiki/IEEE_802.11.

\* cited by examiner

700

710

TRANSMIT A BEAMLOCK TEST FUNCTION COMMAND TO A FIRST APPARATUS, THE BEAMLOCK TEST FUNCTION COMMAND INCLUDING: A FIRST INDICATION THAT BEAMLOCK IS TO BE ACTIVATED ON AT LEAST ONE ANTENNA ARRAY OF A PLURALITY OF ANTENNA ARRAYS, AND A SECOND INDICATION THAT AT LEAST ONE TRANSMITTING BEAM AND/OR AT LEAST ONE RECEIVING BEAM IS TO BE LOCKED ON THE AT LEAST ONE ANTENNA ARRAY

FIG. 7

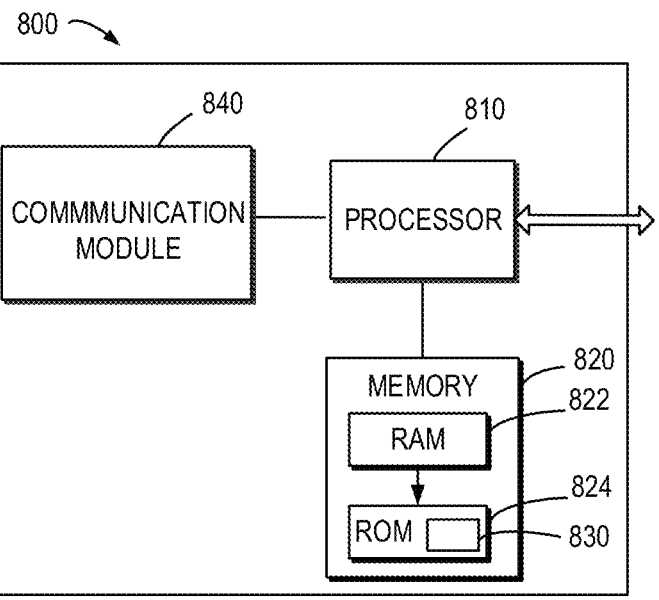

FIG. 8

BEAMLOCK ON A PLURALITY OF ANTENNA ARRAYS

RELATED APPLICATION

The present application claims priority from, and the benefit of, India Provisional Application No. 202341035126, filed on May 19, 2023, the contents of which are hereby incorporated by reference in their entirety.

FIELDS

Various example embodiments of the present disclosure generally relate to the field of telecommunication and in particular to apparatuses, methods, and computer readable storage medium for beamlock on a plurality of antenna arrays.

BACKGROUND

To support the fifth-generation system (5GS) conformance testing, user equipment (UE) special conformance test functions are required. These functions form a part of core requirements and thus have a direct impact on a design of a UE. The UE special conformance test functions vary depending on conformance testing functionality which the functions are designed to support. These conformance test functions are broadly classified into the following two groups. One group comprises test loop functions which require a loop to be established between a UE and a network device such as a System Simulator (SS) to allow, for example, downlink (DL) data packets sent by the SS to be looped back by the UE in uplink (UL). The other group comprises general test functions which need commands sent by the SS, for example, to trigger a certain UE behavior. Such a UE behavior comprises a behavior that is determined by the third-generation partnership project (3GPP) core specification requirements, or a behavior that is needed to facilitate conformance testing but is not part of any 3GPP core specification requirements, or a behavior that is used to provide to the UE information needed for the conformance testing.

The utilization of any UE special conformance test functions may be considered as putting a UE in a test mode. The UE special conformance test functions including relevant procedures and the Test Mode Control (TMC) message contents used for information exchange are defined in the 3GPP standardization, such as TS 38.509. A UE Beamlock test function (UBF) is a UE special conformance test function intended for making a UE to lock an antenna array once the UE has formed a beam in a direction towards a base station (or an SS) following a cell identification procedure in preparation for subsequent test procedures. Activating the UBF may lock the antenna array of all active intra-band component carriers and all Multiple-Input Multiple-Output (MIMO) layers affected by the test function. The UBF is currently applicable for UEs operating in Frequency Range 2 (FR2) but could in principle be applied to any frequency range.

Up to 3GPP New Radio (NR) Release 17 (Rel-17), FR2 UE requirements assume to have only one active antenna array at a time to transmit or receive data towards or from the base station, and the conformance testing of such UEs requires the locking of transmitting (Tx), receiving (Rx), or Tx and Rx (or Tx-Rx) beams in the direction towards the base station. For testing Release 18 (Rel-18) multi-Rx feature, radio frequency (RF) requirements are based on rotating a device on a full sphere. During this rotation, for example, 266 rotations are considered, and the beams need to be locked to take the measurements at each of the 266 points on the sphere. Furthermore, for demodulation testing, two beams for a UE are assumed to be fixed. Therefore, for conformance testing of a UE supporting Rel-18 multi-Rx feature, a UBF for simultaneously locking multiple UE beams is required.

SUMMARY

In a first aspect of the present disclosure, there is provided a first apparatus. The first apparatus comprises at least one processor; and at least one memory storing instructions that, when executed by the at least one processor, cause the first apparatus at least to: receive a beamlock message from a second apparatus, the beamlock message indicating that one or more transmitting beams are to be locked on a first list of antenna arrays and/or one or more receiving beams are to be locked on a second list of antenna arrays; and perform, based on the beamlock message, beamlock of the one or more transmitting beams and/or the one or more receiving beams.

In a second aspect of the present disclosure, there is provided a first apparatus. The first apparatus comprises at least one processor; and at least one memory storing instructions that, when executed by the at least one processor, cause the first apparatus at least to: receive a beamlock test function command from a second apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked; and perform, based on the beamlock test function command, beamlock of the at least one transmitting beam and/or the at least one receiving beam on the at least one antenna array.

In a third aspect of the present disclosure, there is provided a second apparatus. The second apparatus comprises at least one processor; and at least one memory storing instructions that, when executed by the at least one processor, cause the second apparatus at least to: transmit a beamlock message to a first apparatus, the beamlock message indicating that one or more transmitting beams are to be locked on a first list of antenna arrays and/or one or more receiving beams are to be locked on a second list of antenna arrays.

In a fourth aspect of the present disclosure, there is provided a second apparatus. The second apparatus comprises at least one processor; and at least one memory storing instructions that, when executed by the at least one processor, cause the second apparatus at least to: transmit a beamlock test function command to a first apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked.

In a fifth aspect of the present disclosure, there is provided a method. The method comprises: receiving a beamlock message from a second apparatus, the beamlock message indicating that one or more transmitting beams are to be locked on a first list of antenna arrays and/or one or more receiving beams are to be locked on a second list of antenna arrays; and performing, based on the beamlock message, beamlock of the one or more transmitting beams and/or the one or more receiving beams.

In a sixth aspect of the present disclosure, there is provided a method. The method comprises: receiving a beamlock test function command from a second apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked; and performing, based on the beamlock test function command, beamlock of the at least one transmitting beam and/or the at least one receiving beam on the at least one antenna array.

In a seventh aspect of the present disclosure, there is provided a method. The method comprises: transmitting a beamlock message to a first apparatus, the beamlock message indicating that one or more transmitting beams are to be locked on a first list of antenna arrays and/or one or more receiving beams are to be locked on a second list of antenna arrays.

In an eighth aspect of the present disclosure, there is provided a method. The method comprises: transmitting a beamlock test function command to a first apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked.

In a ninth aspect of the present disclosure, there is provided an apparatus. The apparatus comprises means for receiving a beamlock message from a second apparatus, the beamlock message indicating that one or more transmitting beams are to be locked on a first list of antenna arrays and/or one or more receiving beams are to be locked on a second list of antenna arrays; and means for performing, based on the beamlock message, beamlock of the one or more transmitting beams and/or the one or more receiving beams.

In a tenth aspect of the present disclosure, there is provided an apparatus. The apparatus comprises means for receiving a beamlock test function command from a second apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked; and means for performing, based on the beamlock test function command, beamlock of the at least one transmitting beam and/or the at least one receiving beam on the at least one antenna array.

In an eleventh aspect of the present disclosure, there is provided an apparatus. The apparatus comprises means for transmitting a beamlock message to a first apparatus, the beamlock message indicating that one or more transmitting beams are to be locked on a first list of antenna arrays and/or one or more receiving beams are to be locked on a second list of antenna arrays.

In a twelfth aspect of the present disclosure, there is provided an apparatus. The apparatus comprises means for transmitting a beamlock test function command to a first apparatus, the beamlock test function command including: a first indication that beamlock is to be activated on at least one antenna array of a plurality of antenna arrays, and a second indication that at least one transmitting beam and/or at least one receiving beam from the at least one antenna array is to be locked.

In a thirteenth aspect of the present disclosure, there is provided a computer readable medium. The computer readable medium comprises instructions stored thereon for causing an apparatus to perform at least the method according to the fifth, sixth, seventh or eighth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 7 illustrates a flowchart of an example beamlock method at a second apparatus in accordance with some other example embodiments of the present disclosure;

FIG. 8 illustrates a simplified block diagram of a device that is suitable for implementing example embodiments of the present disclosure.

Throughout the drawings, the same or similar reference numerals represent the same or similar element.

DETAILED DESCRIPTION

Figure 1:
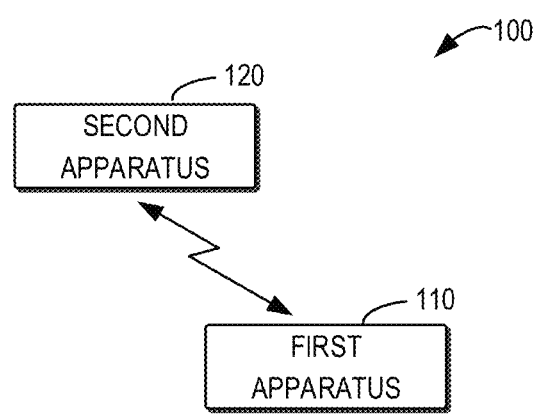
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory (ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

FIG. 1 shows an example communication environment 100 in which example embodiments of the present disclosure can be implemented.

In the communication environment 100, a plurality of communication devices, comprising a first apparatus 110 and a second apparatus 120, can communicate with each other. In some example embodiments, the first apparatus 110 may operate as a terminal device such as a UE, and the second apparatus 120 may operate as a network device such as a base station or a SS.

In the following, for the purpose of illustration, some example embodiments are described with the first apparatus 110 operating as a terminal device and the second apparatus 120 operating as a network device. However, in some example embodiments, operations described with respect to a terminal device may be implemented at a network device or other devices, and operations described with respect to a network device may be implemented at a terminal device or other devices.

In some example embodiments, if the first apparatus 110 is a terminal device and the second apparatus 120 is a network device, a link from the second apparatus 120 to the first apparatus 110 is referred to as a DL, while a link from the first apparatus 110 to the second apparatus 120 is referred to as a UL. In DL, the second apparatus 120 is a Tx device (or a transmitter), and the first apparatus 110 is a Rx device (or a receiver). In UL, the first apparatus 110 is a Tx device (or a transmitter), and the second apparatus 120 is a Rx device (or a receiver). If the first apparatus 110 and the second apparatus 120 are both terminal devices, a link between the first apparatus 110 and the second apparatus 120 is referred to as a sidelink (SL). In SL, one of the first apparatus 110 and the second apparatus 120 is a Tx device (or a transmitter), and the other of the first apparatus 110 and the second apparatus 120 is a Rx device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of devices and their connections are shown in FIG. 1 only for the purpose of illustration without suggesting any limitation. The communication environment 100 may include any suitable number of devices configured to implement example embodiments of the present disclosure.

In the communication environment 100, either or both of the first and second apparatuses 110 and 120 may be provided with a plurality of antenna arrays/panels, each of the antenna arrays/panels having a group of antenna elements that controls a beam independently. In the context of the present disclosure, the terms "antenna array" and "antenna panel" mean the same and can be used interchangeably. On an antenna array/panel, a beam can be selected and used for reception. Across different antenna arrays/panels, a plurality of beams (each selected per array/panel) may be used for reception. A beam may be considered as a mean spatial filter associated with reception.

It is to be understood that any number of antenna arrays can be arranged at the first apparatus 110 and/or the second apparatus 120 depending on the implementations. In some example embodiments, four antenna arrays/panels may be deployed for deriving the spherical coverage requirement for the multi-Rx chain reception. The four antenna arrays/panels are separated into two pairs, and each pair includes two antenna arrays/panels with orthogonal polarizations that are co-located. In some example embodiments, a physical antenna array/panel with dual polarization may be treated as two "arrays/panels". In the following, some example embodiments are described by taking two antenna arrays/panels as an example while the example embodiments herein can be applied in general for a structure with any number of antenna arrays/panels.

In some example embodiments, the second apparatus 120, which may operate as an SS or a base station, may instruct the first apparatus 110, which may operate as a UE, to lock an antenna array after the first apparatus 110 has formed a beam towards the second apparatus 120. The second apparatus 120 may use a beamlock test mode activation procedure to command the first apparatus 110 to lock a beam on an antenna array and use a beamlock test mode deactivation procedure to command the first apparatus 110 to re-track the beam in the direction towards the second apparatus 120.

Figure 2A:
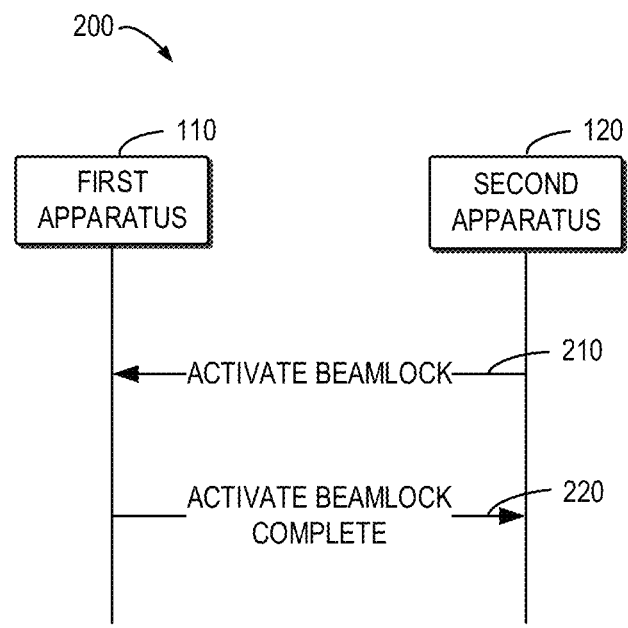
FIG. 2A illustrates an example beamlock test mode activation procedure.
Figure 2B:
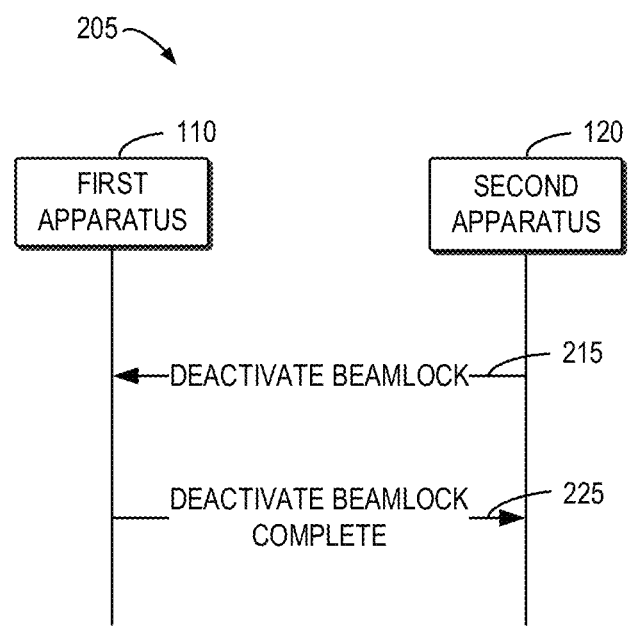
FIG. 2B illustrates an example beamlock test mode deactivation procedure.

FIGS. 2A and 2B show an example beamlock test mode activation procedure 200 and an example beamlock test mode deactivation procedure 205, respectively.

As shown in FIGS. 2A and 2B, the second apparatus 120 transmits (210, 215) 'ACTIVATE BEAMLOCK'/'DEACTIVATE BEAMLOCK' test messages (or 'activate Beamlock'/'deactivate Beamlock' messages or commands) to the first apparatus 110 to instruct the first apparatus 110 to lock/unlock a beam on an antenna array. The first apparatus 110 transmits (220, 225) 'ACTIVATE BEAMLOCK COMPLETE'/'DEACTIVATE BEAMLOCK COMPLETE' (or 'Activate Beamlock Complete'/'Deactivate Beamlock Complete') messages (or commands) to the second apparatus 120 to confirm that it has locked/unlocked the beam. The 'ACTIVATE BEAMLOCK' and 'DEACTIVATE BEAMLOCK' messages, which are sent in the direction from the second apparatus 120 to the first apparatus 110, may be embedded in a radio resource control (RRC) 'DLInformationTransfer' message. The 'ACTIVATE BEAMLOCK COMPLETE' and 'DEACTIVATE BEAMLOCK COMPLETE' messages, which are sent in the direction from the first apparatus 110 to the second apparatus 120, may be embedded in a RRC 'ULInformationTransfer' message.

In some example embodiments, the second apparatus 120 may use a UBF in the "ACTIVATE BEAMLOCK" message to indicate to the first apparatus 110 which beam is to be locked on an antenna array. For example, if UBF=01, only a Tx beam is locked on an antenna array. If UBF=10, only a Rx beam is locked on an antenna array. If UBF=11, both Tx and Rx beams are locked on an antenna array. Table 1 shows an example structure of the 'ACTIVATE BEAM-LOCK' message.

TABLE 1

| Information Element | Presence | Format | Length |
|---|---|---|---|
| Protocol discriminator | M | V | ½ |
| Skip indicator | M | V | ½ |
| Message type | M | V | 1 |
| UE Beamlock test Function | M | V | 1 | where the message type is as follows:

TABLE 2

| 8 | 7 | 6 | 5 | 4 | 3 | 2 | 1 | bit no. |
|---|---|---|---|---|---|---|---|---|
| 1 | 0 | 1 | 0 | 0 | 0 | 0 | 0 | octet 1 | where UE beamlock test function is as follows:

TABLE 3

| 8 | 7 | 6 | 5 | 4 | 3 | 2 | 1 | bit no. |
|---|---|---|---|---|---|---|---|---|
|   |   |   |   |   |   | X1 | X2 | octet 1 | where X1, X2=01 for activating beamlock of the Tx beam only, 10 for activate beamlock of the Rx beam only and 11 for activating beamlock of both the Tx and Rx beams.

In an example, example contents of the 'ACTIVATE BEAMLOCK' message is as below.

TABLE 4

| Information Element | Value/remark | Comment | Condition |
|---|---|---|---|
| Protocol discriminator | 1 1 1 1 | | |
| Skip indicator | 0 0 0 0 | | |
| Message type | 1 0 1 0 0 0 0 0 | | |
| UE Beamlock test Function | 0 0 0 0 0 0 0 1 | Tx Only | |
| UE Beamlock test Function | 0 0 0 0 0 0 1 0 | Rx Only | |
| UE Beamlock test Function | 0 0 0 0 0 0 1 1 | Tx and Rx | |

Here, "Tx Only", "Rx Only" and "Tx and Rx" mean that only the Tx beam, only the Rx beam and both the Tx and Rx beams. This UBF uses only first two bits (bit position '1' and '2', i.e., X2 and X1 as shown in Table 3) of Octet 1 of a UBF inside the 'ACTIVATE BEAMLOCK' command. The possible four different combinations of X2X1, i.e., 00, 01, 10, and 11 are sufficient to instruct the first apparatus 110 to either not lock any beam, lock the Tx beam, lock the Rx beam, or lock both Tx-Rx beams, respectively, on its single active antenna array and hence is sufficient for the testing up to Release 17 UEs.

However, the ACTIVATE BEAMLOCK procedure as described above can control only one active antenna array but cannot control a plurality of antenna arrays simultaneously. In 3GPP NR Release 18, FR2 UEs can have a plurality of simultaneously active antenna arrays to harvest diversity and spatial-multiplexing gain while transmitting and receiving the data towards and from the base station through a plurality of spatial directions such as a plurality of angles of arrival (AoAs) and angles of departure (AoDs). To perform the conformance test of such UEs, it will require to lock the Tx/Rx/Tx-Rx beams of each of active antenna arrays independently in the direction towards the antenna probes of the base station or the SS.

For multi-Tx/multi-Rx UEs having a plurality of simultaneously active antenna arrays, the possible beam lock combinations will increase compared to those of the single active antenna array. Such an example for a multi-Tx/multi-Rx UE having two active antenna arrays, denoted by Array 1 and Array 2, is shown in Table 5 below where two simultaneously active antenna arrays result in sixteen different combinations for beamlock on two active antenna arrays.

TABLE 5

| | | Array 2 | | | |
|---|---|---|---|---|---|
| Lock UE Beam for: | | No Lock | Tx Only | Rx Only | Both Tx-Rx |
| Array 1 | No Lock | Case 1 | Case 5 | Case 9 | Case 13 |
| | Tx Only | Case 2 | Case 6 | Case 10 | Case 14 |
| | Rx Only | Case 3 | Case 7 | Case 11 | Case 15 |
| | Both Tx-Rx | Case 4 | Case 8 | Case 12 | Case 16 |

In Table 5, four beamlock options associated with Array 1 are shown in different rows whereas the four beamlock options associated with Array 2 are shown in different columns. This gives sixteen different possible beamlock combinations for Arrays 1 and 2, which are represented as 4×4 matrix in Table 5. Each of the cases 1 to 16 shows a possible beamlock combination on Arrays 1 and 2. For example, Case 5 represents a combination of no beamlock on Array 1 and only Tx beamlock on Array 2. Similarly, Case 11 represents a combination of only Rx beamlock on both Arrays 1 and 2.

Therefore, there is a need to instruct the multi-Tx/multi-Rx capable UE to lock a plurality of beams towards the base station or the SS simultaneously from multiple active antenna arrays and/or lock different combinations of Tx and/or Rx beams on simultaneously active multiple antenna arrays.

Example embodiments of the present disclosure propose a beamlock scheme to instruct a device to lock different combinations of Tx/Rx/Tx-Rx beams on simultaneously active multiple antenna arrays. This scheme can support the beamlock for multiple antenna arrays (also referred to as multi-beamlock) and will be beneficial for current and future 3GPP feature testing, e.g., multi-Rx capable UEs (Rel-18 feature), multi-Tx capable UEs (Rel-18 feature), full-duplex UEs (expected in future release(s)). In future 3GPP releases which will support more advanced features like Full Duplex UEs, this scheme is applicable for the conformance testing of the UEs supporting simultaneous transmissions and receptions through multiple simultaneously active antenna arrays which will require the independent locking of beams on each active array.

It is to be noted that although the issue is originating from the testing scenario, the proposed scheme herein may be applied in general for different scenarios which need multi-beamlock. For example, in a positioning scenario, a UE may use a fixed Tx beam for UL transmission towards serving and neighboring base stations. In this scenario, the multi-beamlock needs to be performed by UE. In the following, some example embodiments will be described in the testing scenario as an example while the example embodiments herein can be applied in general for other scenarios.

Some example embodiments define a function to support independent locking of beams at a plurality of active antenna arrays. Some example implementations in this regard will be described below with reference to FIGS. 3 and 4.

Figure 3:
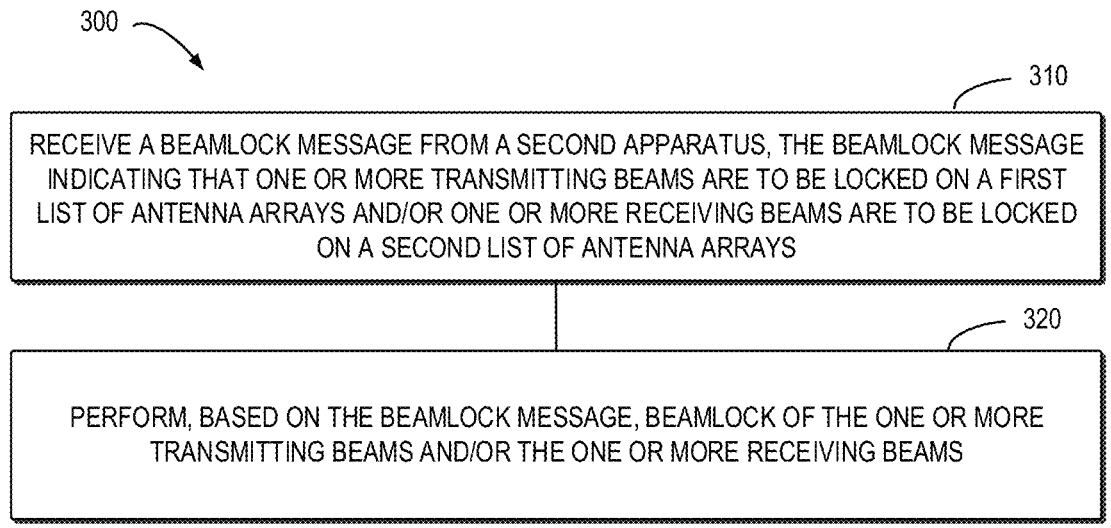
FIG. 3 illustrates a flowchart of an example beamlock method at a first apparatus in accordance with some example embodiments of the present disclosure.

FIG. 3 shows a flowchart of an example beamlock method 300 in accordance with some example embodiments of the present disclosure. The method 300 can be implemented by the first apparatus 110 in FIG. 1. For the purpose of discussion, the method 300 will be described from the perspective of the first apparatus 110 with reference to FIG. 1.

As shown in FIG. 3, at block 310, the first apparatus 110 receives a beamlock message from the second apparatus 120. The beamlock message indicates that one or more Tx beams are to be locked on a first list of antenna arrays and/or one or more Rx beams are to be locked on a second list of antenna arrays. The first or second list of antenna arrays may comprise one or more antenna arrays where the Tx or Rx beam(s) is to be locked. As such, Tx/Rx beamlock may be performed on any number of antenna arrays, which is more flexible.

In some example embodiments, the beamlock message may include a list of array identifications (IDs) of the first list of antenna arrays to indicate that the one or more Tx beams are to be locked on the first list of antenna arrays. Alternatively, or in addition, the beamlock message may include a list of array IDs of the second list of antenna arrays to indicate that the one or more Rx beams are to be locked on the second list of antenna arrays. Thus, all the required array IDs can be indicated simultaneously, which is more efficient.

These array IDs may comprise ordered array IDs which indicates a rank of the first or second list of antenna arrays among a plurality of antenna arrays of the first apparatus 110 based on beam measurements. For example, the ordered array IDs may start from the best array, the 2nd best array, and so on.

Alternatively, or in addition, the array IDs comprise physical array IDs of the first or second list of antenna arrays. For example, the second apparatus 120 may have prior information about the number of antenna arrays of the first apparatus 110 and the corresponding physical IDs of the antenna arrays. Then, the second apparatus 120 may indicate the physical ID of the antenna array where Tx/Rx/Tx-Rx beam(s) need to be locked. The second apparatus 120 may acquire the information of physical IDs in any suitable way, and the scope of the present disclosure will not be limited in this regard.

In some example embodiments, the beamlock message may include an indication that a beamlock command for a plurality of beams is activated. If the first apparatus 110 receives a beamlock message without such an activation indication, the first apparatus 110 may be behave in a legacy way. For example, the first apparatus 110 may perform beamlock based on the UBF as shown in Table 4 sent from the second apparatus 120.

In some example embodiments, the beamlock message may be carried via RRC signaling. In an example, the beamlock message may comprise a DL Information Transfer (or 'DLInformationTransfer') message such as an "Activate Beamlock" message. For example, an information element (IE) may be defined in a RRC message, for example, a DL Information Transfer message, to indicate BEAMLOCK for locking Tx/Rx/Tx-Rx beam(s) independently on each active antenna array. Example IEs in a DLInformationTransfer message are shown as blow.

```
-- ASN1START
-- TAG-DLINFORMATIONTRANSFER-START
DLInformationTransfer ::=           SEQUENCE {
    rrc-TransactionIdentifier           RRC-TransactionIdentifier,
    criticalExtensions                  CHOICE {
        dlInformationTransfer               DLInformationTransfer-IEs,
        criticalExtensionsFuture            SEQUENCE { }
    }
}
DLInformationTransfer-IEs ::=   SEQUENCE {
    dedicatedNAS-Message            DedicatedNAS-Message                OPTIONAL,   -- Need N
    lateNonCriticalExtension        OCTET STRING                        OPTIONAL,
    nonCriticalExtension            DLInformationTransfer-v1610-IEs     OPTIONAL
}
DLInformationTransfer-v1610-IEs ::= SEQUENCE {
    referenceTimeInfo-r16           ReferenceTimeInfo-r16               OPTIONAL,   -- Need N
    nonCriticalExtension            DLInformationTransfer-v1700-IEs     OPTIONAL
}
DLInformationTransfer-v1700-IEs ::= SEQUENCE {
    dedicatedInfoF1c-r17            DedicatedInfoF1c-r17                OPTIONAL,   -- Need N
    rxTxTimeDiff-gNB-r17            RxTxTimeDiff-r17                    OPTIONAL,   -- Need N
    ta-PDC-r17                      ENUMERATED {activate,deactivate}    OPTIONAL,   -- Need N
    sib9Fallback-r17                ENUMERATED {true}                   OPTIONAL,   -- Need N
    nonCriticalExtension            DLInformationTransfer-v1800-IEs     OPTIONAL
}
DLInformationTransfer-v1800-IEs ::= SEQUENCE {
    Activate-Multi-Beamlock         ENUMERATED                          {true, false} OPTIONAL,
    Multi-Beamlock-Tx-List          SEQUENCE (SIZE (0.. maxNrofArrays)) OF Array-Identity
```

| Multi-Beamlock-Rx-List | SEQUENCE (SIZE (0.. maxNrofArrays)) OF Array-Identity | |
|---|---|---|
| nonCriticalExtension | SEQUENCE { } | OPTIONAL |

}
-- TAG-DLINFORMATIONTRANSFER-STOP
-- ASN1STOP

The Array-Identity IE is proposed to be used to identify an active antenna array of the first apparatus 110. An example Array-Identity IE is shown as below.

```
-- ASN1START
-- TAG-ARRAY-IDENTITY-START
Array-Identity ::=      INTEGER (1.. maxNrofArrays)
maxNrofArrays           INTEGER ::= 32 (for example)
-- TAG-ARRAY-IDENTITY-STOP
```

In this example, the proposed DLInformationTransfer-v1800-IEs contains a field Activate-Multi-Beamlock which is used to indicate whether a beamlock command for a plurality of beams, also referred to as a multi-beamlock command, is activated. For example, if Activate-Multi-Beamlock is set to 'TRUE', then the multi-beamlock command is activated. A field Multi-Beamlock-Tx-List, which is used to indicate the list of array IDs of the first list of antenna arrays, contains the IDs of all antenna array(s) where Tx beamlock is indicated. A field Multi-Beamlock-Rx-List, which is used to indicate the list of array IDs of the second list of antenna arrays, contains the IDs of all antenna array(s) where Rx beamlock is indicated. To indicate both Tx and Rx beamlock on antenna array(s), the corresponding array ID(s) may be included in both Multi-Beamlock-Tx-List and Multi-Beamlock-Rx-List fields. If Activate-Multi-Beamlock is set to 'FALSE', the Multi-Beamlock-Tx-List and Multi-Beamlock-Rx-List fields may not be included.

In some example embodiments, the beamlock message may include a predetermined array ID for the first list of antenna arrays to indicate that a plurality of Tx beams is to be locked on a plurality of antenna arrays of the first apparatus 110. Alternatively, or in addition, the beamlock message may include a predetermined array ID for the second list of antenna arrays to indicate that a plurality of Rx beams is to be locked on the plurality of antenna arrays of the first apparatus 110. The predetermined array ID may have any value and can be used as an indication for common beamlock of a plurality of antenna arrays.

In an example, array ID '0' may be reserved and used to indicate the common beamlock of the plurality of antenna arrays of the first apparatus 110. Non-zero array IDs may be used to indicate independent beamlock. Thus, both independent and common beamlock may be supported.

At block 320, based on the beamlock message, the first apparatus 110 performs beamlock of the one or more Tx beams and/or the one or more Rx beams. In this way, beamlock of a plurality of beams (or multi-beamlock) may be supported for a device having any number of active antenna arrays. Such multi-beamlock may support both independent and common beamlock for a plurality of beams on a plurality of antenna arrays.

Figure 4:
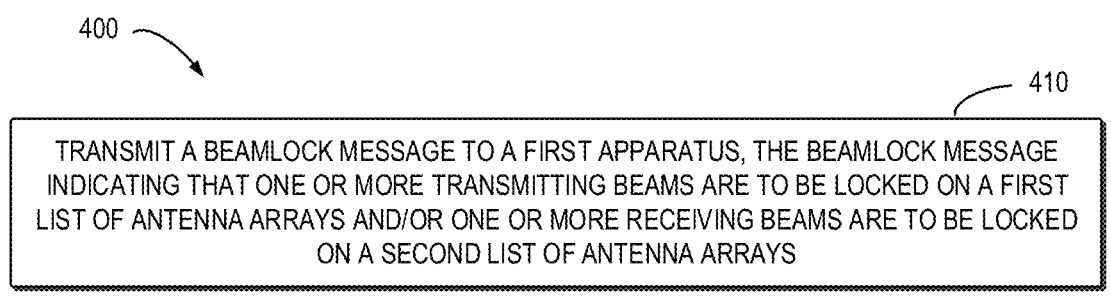
FIG. 4 illustrates a flowchart of an example beamlock method at a second apparatus in accordance with some example embodiments of the present disclosure.

FIG. 4 shows a flowchart of an example beamlock method 400 in accordance with some example embodiments of the present disclosure. The method 400 can be implemented by the second apparatus 120 in FIG. 1. For the purpose of discussion, the method 400 will be described from the perspective of the second apparatus 120 with reference to FIG. 1.

As shown in FIG. 4, at block 410, the second apparatus 120 transmits a beamlock message to a first apparatus. The beamlock message indicates that one or more transmitting beams are to be locked on a first list of antenna arrays and/or one or more receiving beams are to be locked on a second list of antenna arrays.

In some example embodiments, the beamlock message may include at least one of: a list of array identifications of the first list of antenna arrays to indicate that the one or more transmitting beams are to be locked on the first list of antenna arrays; or a list of array identifications of the second list of antenna arrays to indicate that the one or more receiving beams are to be locked on the second list of antenna arrays.

In some example embodiments, the list of array identifications of the first list of antenna arrays or the list of array identifications of the second list of antenna arrays may comprise one or more ordered array identifications of the first or second list of antenna arrays. The one or more ordered array identifications may indicate a rank of the first or second list of antenna arrays among a plurality of antenna arrays of the first apparatus based on beam measurements.

In some example embodiments, the list of array identifications of the first list of antenna arrays or the list of array identifications of the second list of antenna arrays may comprise one or more physical array identifications of the first or second list of antenna arrays.

In some example embodiments, the beamlock message may include at least one of: a predetermined array identification for the first list of antenna arrays to indicate that a plurality of transmitting beams is to be locked on a plurality of antenna arrays of the first apparatus; or a predetermined array identification for the second list of antenna arrays to indicate that a plurality of receiving beams is to be locked on the plurality of antenna arrays of the first apparatus.

In some example embodiments, the beamlock message may include an indication that a beamlock command for a plurality of beams is activated.

In some example embodiments, the beamlock message may be carried via RRC signaling.

In some example embodiments, the beamlock message comprises an "Activate Beamlock" message.

All operations and features related to the second apparatus 120 as described above with reference to FIGS. 1 to 3 are likewise applicable to the method 400 and have similar effects. For the purpose of simplification, the details will be omitted.

Some example embodiments enhance the existing UBF as shown in Table 4 to support independent locking of beams for a plurality of active antenna arrays. Some example implementations in this regard will be described below with reference to FIGS. 5 to 7.

Figure 5:
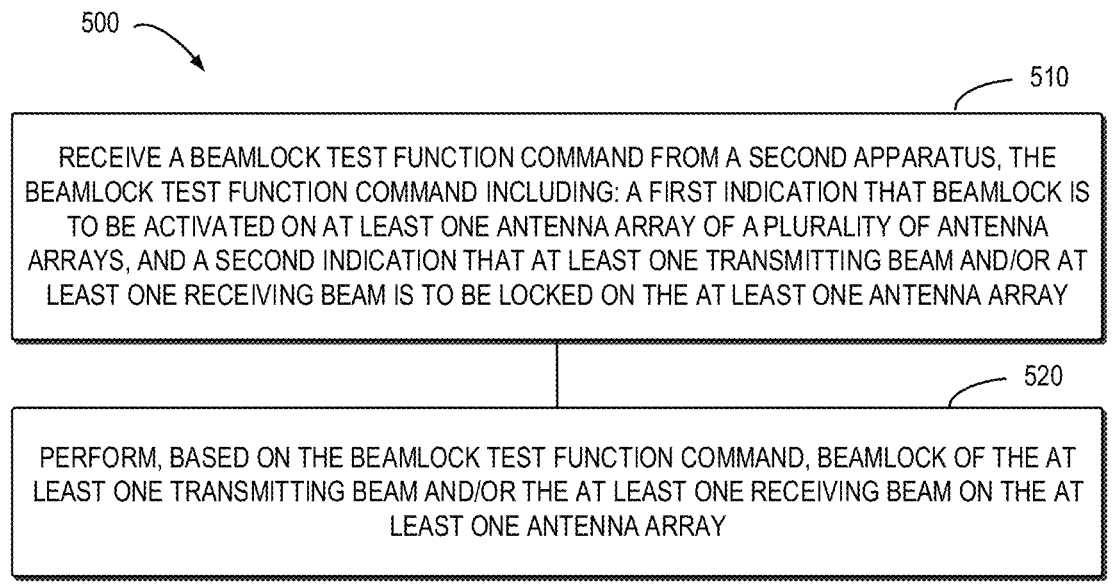
FIG. 5 illustrates a flowchart of an example beamlock method at a first apparatus in accordance with some other example embodiments of the present disclosure.

FIG. 5 shows a flowchart of an example beamlock method 500 in accordance with some example embodiments of the present disclosure. The method 500 can be implemented by the first apparatus 110 in FIG. 1. For the purpose of discussion, the method 500 will be described from the perspective of the first apparatus 110 with reference to FIG. 1.

As shown in FIG. 5, at block 510, the first apparatus 110 receives a beamlock test function command such as a UBF (command) from the second apparatus 120. The beamlock test function command includes a first indication that beamlock is to be activated on at least one antenna array of a plurality of antenna arrays. The beamlock test function command further includes a second indication that at least one Tx beam and/or at least one Rx beam is to be locked on the at least one antenna array. At block 520, based on the beamlock test function command, the first apparatus 110 performs beamlock of the at least one Tx beam and/or the at least one Rx beam on the at least one antenna array.

In some example embodiments, the first indication may comprise an ID of a target antenna array of the plurality of antenna arrays to indicate that the beamlock is to be activated on the target antenna array. The ID of the target antenna array may comprise an ordered array ID of the target antenna array which indicates a rank of the target antenna array among the plurality of antenna arrays based on beam measurements. Alternatively, or in addition, the ID of the target antenna array may comprise a physical array ID of the target antenna array.

In some example embodiments, the beamlock test function command may include a third indication that the beamlock test function command is activated. Based on the third indication, the first apparatus 110 may be indicated whether multi-beamlock is activated.

In some example embodiments, the beamlock test function command is carried in an "Activate Beamlock" message. In some example embodiments, the unused bits (Bit Positions '3' to '8') of the UBF octet as shown in Table 3 may be used to carry the first and/or third indication. In an example, either all or some of the unused bit positions '3' to '8' (see Table 3) may be used to indicate the ordered/physical ID of antenna array on which the first apparatus 110 needs to lock Tx/Rx/Tx-Rx beam(s) as indicated by X1X2. By exploiting the unused bits in UBF octet, less modification may be introduced to the standardization, and signaling overhead may be reduced. Moreover, backward compatibility with the present standard may be achieved.

One example is given below where bit positions '3' to '8' are used to define the ID or address of the antenna array (A6A5A4A3A2A1) with reference to Table 6.

TABLE 6

| 8 | 7 | 6 | 5 | 4 | 3 | 2 | 1 | bit no. |
|---|---|---|---|---|---|---|---|---------|
| A6 | A5 | A4 | A3 | A2 | A1 | X1 | X2 | octet 1 |

In this example, the bit position '8' (A6) is used to carry the third indication to activate the beamlock test function command. For example, if A6=0, then the multi-beamlock test function command is activated. Otherwise, the multi-beamlock test function command is not activated, the first apparatus 110 may behave in a legacy way.

The bit positions '3' to '7' (A5A4A3A2A1) are used to carry the first indication on which antenna array(s) the beamlock is to be activated. The bit positions '2' and '1' (X1X2) are used to carry the second indication which Tx beam(s) and/or Rx beam(s) is to be locked on the at least one antenna array identified by A5A4A3A2A1.

In an example, if A5A4A3A2A1=00000, then the Tx/Rx/TxRx beam(s) as instructed by X1X2 is to be locked on the best active or the $1^{st}$ physical array. If A5A4A3A2A1=00001, then the Tx/Rx/TxRx beam(s) as instructed by X1X2 is to be locked on the $2^{nd}$ best active/$2^{nd}$ physical array. If A5A4A3A2A1=00010, then the Tx/Rx/TxRx beam(s) as instructed by X1X2 is to be locked on the $3^{rd}$ best active/$3^{rd}$ physical array. Likewise, if A5A4A3A2A1=11111, the Tx/Rx/TxRx beam(s) as instructed by X1X2 is to be locked on the $32^{nd}$ best active/$32^{nd}$ physical array.

In some example embodiments, the beamlock test function command for each active UE antenna array may be transmitted by the second apparatus 120 sequentially after receiving the acknowledgement from the first apparatus 110 for the previous beamlock test function command. This will be beneficial in diagnosis of where the acknowledgement for the previous command is not received (due to any reason or error).

An example test procedure to lock the Tx beam on the best/$1^{st}$ physical array, the Rx beam on the $3^{rd}$ best/physical array and the Tx and Rx beams on the $4^{th}$ best/physical array using independent beamlock will be described below with reference to FIG. 6A.

Figure 6A:
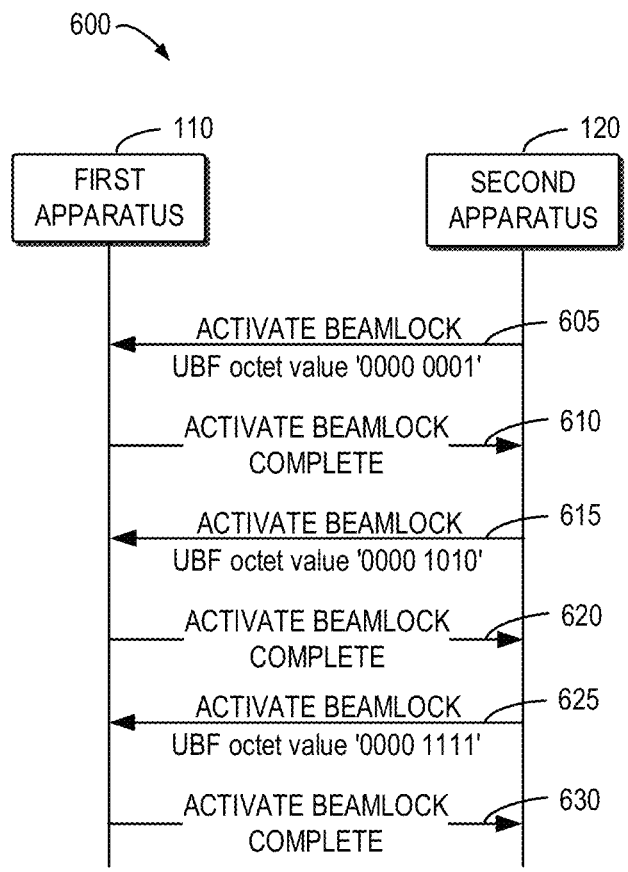
FIG. 6A illustrates a signaling diagram of an example beamlock process in accordance with some example embodiments of the present disclosure.

FIG. 6A shows an example beamlock process 600 in accordance with some example embodiments of the present disclosure.

As shown in FIG. 6A, the second apparatus 120, which may be an SS, sends (605) an "ACTIVATE BEAMLOCK" message with UBF octet value '0000 0001' to the first apparatus 110 which may be a UE. Accordingly, the first apparatus 110 may know that the Tx beam on the best/$1^{st}$ physical array is to be locked. After the beamlock is performed for the Tx beam on the best/$1^{st}$ physical array, the first apparatus 110 sends (610) an "ACTIVATE BEAMLOCK COMPLETE" message to the second apparatus 120.

After such acknowledgement is received from the first apparatus 110 for the previous "ACTIVATE BEAMLOCK" message, the second apparatus 120 sends (615) an "ACTIVATE BEAMLOCK" message again with UBF octet value '0000 1010', which indicates that the Rx beam on the $3^{rd}$ best/physical array is to be locked. After the first apparatus 110 performs the beamlock for the Rx beam on the $3^{rd}$ best/physical array, the first apparatus 110 sends (620) an "ACTIVATE BEAMLOCK COMPLETE" message.

Again, the second apparatus 120 sends (625) an "ACTIVATE BEAMLOCK" message with UBF octet value '0000 1111'. Accordingly, the first apparatus 110 may perform the beamlock for the Tx and Rx beams on the $4^{th}$ best/physical array. Then, the first apparatus 110 sends (630) an "ACTIVATE BEAMLOCK COMPLETE" message.

In some example embodiments, the first indication that beamlock is to be activated on at least one antenna array of a plurality of antenna arrays may comprise an indication that the beamlock is to be activated on each of the plurality of antenna arrays. In this way, common beamlock may be indicated to the first apparatus 110 for each of the plurality of antenna arrays, thereby signaling overhead may be further reduced.

In some example embodiments, any one of the currently unused bit positions '3' to '8' (see Table 3) may be used to indicate the common beamlock for locking Tx/Rx/Tx-Rx beam(s) as indicated by X1X2. One example is given below where the bit position '8' is used to indicate the common beamlock to the first apparatus 110 with reference to Table 7.

TABLE 7

| 8 | 7 | 6 | 5 | 4 | 3 | 2 | 1 | bit no. |
|---|---|---|---|---|---|---|---|---------|
| A6 | | | | | | X1 | X2 | octet 1 |

In this example, the bit position '8' (A6) is used to indicate the common beamlock. For example, if A6=1, then the Tx/Rx/Tx-Rx beam(s) as instructed by X1X2 is to be locked on all active UE antenna array(s). The bits in bit position '3', '4', '5', '6', and '7' of UBF octet may be ignored. If A6=0, then the first apparatus 110 may behave in a legacy way.

In some example embodiments, the independent beamlock and the common beamlock may be combined. For example, a dynamic selection may be made between the independent beamlock and the common beamlock by setting bit position '8', i.e., A6. For example, if A6='1', the common beamlock is selected. If A6='0', the independent beamlock is selected.

An example test procedure to lock the Tx beam on all active array(s) using the common beamlock will be described below with reference to FIG. 6B.

Figure 6B:
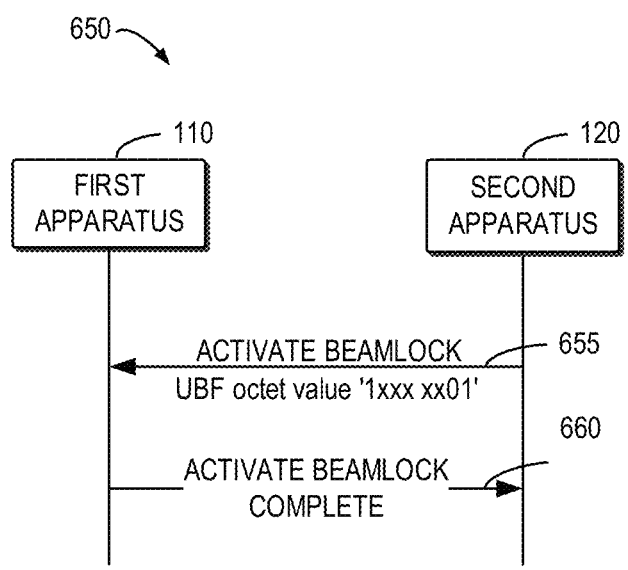
FIG. 6B illustrates a signaling diagram of an example beamlock process in accordance with some other example embodiments of the present disclosure.

FIG. 6B shows an example beamlock process 650 in accordance with some example embodiments of the present disclosure.

As shown in FIG. 6B, the second apparatus 120 sends (655) an "ACTIVATE BEAMLOCK" message with UBF octet value '1xxx xx01'. Based on the "ACTIVATE BEAMLOCK" message, the first apparatus 110 may determine that Tx beams on all active arrays are to be locked. After the beamlock is performed for Tx beams on all active arrays, the first apparatus 110 sends (660) an "ACTIVATE BEAMLOCK COMPLETE" message. Thus, the sequential sending of command (as shown in FIG. 6A) for the independent beamlock is not needed.

FIG. 7 shows a flowchart of an example beamlock method 700 in accordance with some example embodiments of the present disclosure. The method 700 can be implemented by the second apparatus 120 in FIG. 1. For the purpose of discussion, the method 700 will be described from the perspective of the second apparatus 120 with reference to FIG. 1.

As shown in FIG. 7, at block 710, the second apparatus 120 transmits a beamlock test function command to the first apparatus 110. The beamlock test function command includes: a first indication that beamlock is to be activated on at least one antenna array of a plurality of antenna arrays, and a second indication that at least one transmitting beam and/or at least one receiving beam is to be locked on the at least one antenna array.

In some example embodiments, the first indication may comprise an identification of a target antenna array of the plurality of antenna arrays to indicate that the beamlock is to be activated on the target antenna array.

In some example embodiments, the identification of the target antenna array may comprise an ordered array identification of the target antenna array. The ordered array identification may indicate a rank of the target antenna array among the plurality of antenna arrays based on beam measurements.

In some example embodiments, the identification of the target antenna array may comprise a physical array identification of the target antenna array.

In some example embodiments, the first indication may comprise an indication that the beamlock is to be activated on each of the plurality of antenna arrays.

In some example embodiments, the beamlock test function command may include a third indication that the beamlock test function command is activated.

In some example embodiments, the beamlock test function command may be carried in an "Activate Beamlock" message.

All operations and features related to the second apparatus 120 as described above with reference to FIGS. 1, 2A, 2B, 5, 6A and 6B are likewise applicable to the method 700 and have similar effects. For the purpose of simplification, the details will be omitted.

Example Apparatus, Device and Medium

In some example embodiments, an apparatus capable of performing the method 300 (for example, the first apparatus 110 in FIG. 1) may comprise means for performing the respective operations of the method [AA-NUM]00. The means may be implemented in any suitable form. For example, the means may be implemented in a circuitry or software module. The first apparatus may be implemented as or included in the first apparatus 110 in FIG. 1.

In some example embodiments, the apparatus comprises means for receiving a beamlock message from a second apparatus, the beamlock message indicating that one or more transmitting beams are to be locked on a first list of antenna arrays and/or one or more receiving beams are to be locked on a second list of antenna arrays; and means for performing, based on the beamlock message, beamlock of the one or more transmitting beams and/or the one or more receiving beams.

In some example embodiments, the beamlock message includes at least one of: a list of array identifications of the first list of antenna arrays to indicate that the one or more transmitting beams are to be locked on the first list of antenna arrays; or a list of array identifications of the second list of antenna arrays to indicate that the one or more receiving beams are to be locked on the second list of antenna arrays.

In some example embodiments, the list of array identifications of the first list of antenna arrays or the list of array identifications of the second list of antenna arrays comprises one or more ordered array identifications of the first or second list of antenna arrays, wherein the one or more ordered array identifications indicate a rank of the first or second list of antenna arrays among a plurality of antenna arrays of the first apparatus based on beam measurements.

In some example embodiments, the list of array identifications of the first list of antenna arrays or the list of array identifications of the second list of antenna arrays comprises one or more physical array identifications of the first or second list of antenna arrays.

In some example embodiments, the beamlock message includes at least one of: a predetermined array identification for the first list of antenna arrays to indicate that a plurality of transmitting beams is to be locked on a plurality of antenna arrays of the first apparatus; or a predetermined array identification for the second list of antenna arrays to indicate that a plurality of receiving beams is to be locked on the plurality of antenna arrays of the first apparatus.

In some example embodiments, the beamlock message includes an indication that a beamlock command for a plurality of beams is activated.

In some example embodiments, the beamlock message is carried via radio resource control signaling.

In some example embodiments, the beamlock message comprises an "Activate Beamlock" message.

In some example embodiments, the apparatus further comprises means for performing other operations in some example embodiments of the method 300 or the first apparatus 110. In some example embodiments, the means comprises at least one processor; and at least one memory storing instructions that, when executed by the at least one processor, cause the performance of the apparatus.

In some example embodiments, an apparatus capable of performing the method 500 (for example, the first apparatus 110 in FIG. 1) may comprise means for performing the respective operations of the method 500. The means may be implemented in any suitable form. For example, the means may be implemented in a circuitry or software module. The second apparatus may be implemented as or included in the first apparatus 110 in FIG. 1.

In some example embodiments, the apparatus comprises means for receiving a beamlock test function command from a second apparatus, the beamlock test function command including: a first indication that beamlock is to be activated on at least one antenna array of a plurality of antenna arrays, and a second indication that at least one transmitting beam and/or at least one receiving beam is to be locked on the at least one antenna array; and means for performing, based on the beamlock test function command, beamlock of the at least one transmitting beam and/or the at least one receiving beam on the at least one antenna array.

In some example embodiments, the first indication comprises an identification of a target antenna array of the plurality of antenna arrays to indicate that the beamlock is to be activated on the target antenna array.

In some example embodiments, the identification of the target antenna array comprises an ordered array identification of the target antenna array, wherein the ordered array identification indicates a rank of the target antenna array among the plurality of antenna arrays based on beam measurements.

In some example embodiments, the identification of the target antenna array comprises a physical array identification of the target antenna array.

In some example embodiments, the first indication comprises an indication that the beamlock is to be activated on each of the plurality of antenna arrays.

In some example embodiments, the beamlock test function command includes a third indication that the beamlock test function command is activated.

In some example embodiments, the beamlock test function command is carried in an "Activate Beamlock" message.

In some example embodiments, the apparatus further comprises means for performing other operations in some example embodiments of the method 500 or the first apparatus 110. In some example embodiments, the means comprises at least one processor; and at least one memory storing instructions that, when executed by the at least one processor, cause the performance of the apparatus.

In some example embodiments, an apparatus capable of performing the method 400 (for example, the second apparatus 120 in FIG. 1) may comprise means for performing the respective operations of the method 400. The means may be implemented in any suitable form. For example, the means may be implemented in a circuitry or software module. The third apparatus may be implemented as or included in the second apparatus 120 in FIG. 1.

In some example embodiments, the apparatus comprises means for transmitting a beamlock message to a first apparatus, the beamlock message indicating that one or more transmitting beams are to be locked on a first list of antenna arrays and/or one or more receiving beams are to be locked on a second list of antenna arrays.

In some example embodiments, the beamlock message includes at least one of: a list of array identifications of the first list of antenna arrays to indicate that the one or more transmitting beams are to be locked on the first list of antenna arrays; or a list of array identifications of the second list of antenna arrays to indicate that the one or more receiving beams are to be locked on the second list of antenna arrays.

In some example embodiments, the list of array identifications of the first list of antenna arrays or the list of array identifications of the second list of antenna arrays comprises one or more ordered array identifications of the first or second list of antenna arrays, wherein the one or more ordered array identifications indicate a rank of the first or second list of antenna arrays among a plurality of antenna arrays of the first apparatus based on beam measurements.

In some example embodiments, the list of array identifications of the first list of antenna arrays or the list of array identifications of the second list of antenna arrays comprises one or more physical array identifications of the first or second list of antenna arrays.

In some example embodiments, the beamlock message includes at least one of: a predetermined array identification for the first list of antenna arrays to indicate that a plurality of transmitting beams is to be locked on a plurality of antenna arrays of the first apparatus; or a predetermined array identification for the second list of antenna arrays to indicate that a plurality of receiving beams is to be locked on the plurality of antenna arrays of the first apparatus.

In some example embodiments, the beamlock message includes an indication that a beamlock command for a plurality of beams is activated.

In some example embodiments, the beamlock message is carried via radio resource control signaling.

In some example embodiments, the beamlock message comprises an "Activate Beamlock" message.

In some example embodiments, the apparatus further comprises means for performing other operations in some example embodiments of the method 400 or the second apparatus 120. In some example embodiments, the means comprises at least one processor; and at least one memory storing instructions that, when executed by the at least one processor, cause the performance of the apparatus.

In some example embodiments, an apparatus capable of performing the method 700 (for example, the second apparatus 120 in FIG. 1) may comprise means for performing the respective operations of the method 700. The means may be implemented in any suitable form. For example, the means may be implemented in a circuitry or software module. The fourth apparatus may be implemented as or included in the second apparatus 120 in FIG. 1.

In some example embodiments, the apparatus comprises means for transmitting a beamlock test function command to a first apparatus, the beamlock test function command including: a first indication that beamlock is to be activated on at least one antenna array of a plurality of antenna arrays, and a second indication that at least one transmitting beam and/or at least one receiving beam is to be locked on the at least one antenna array.

In some example embodiments, the first indication comprises an identification of a target antenna array of the plurality of antenna arrays to indicate that the beamlock is to be activated on the target antenna array.

In some example embodiments, the identification of the target antenna array comprises an ordered array identification of the target antenna array, wherein the ordered array identification indicates a rank of the target antenna array among the plurality of antenna arrays based on beam measurements.

In some example embodiments, the identification of the target antenna array comprises a physical array identification of the target antenna array.

In some example embodiments, the first indication comprises an indication that the beamlock is to be activated on each of the plurality of antenna arrays.

In some example embodiments, the beamlock test function command includes a third indication that the beamlock test function command is activated.

In some example embodiments, the beamlock test function command is carried in an "Activate Beamlock" message.

In some example embodiments, the apparatus further comprises means for performing other operations in some example embodiments of the method 700 or the second apparatus 120. In some example embodiments, the means comprises at least one processor; and at least one memory storing instructions that, when executed by the at least one processor, cause the performance of the apparatus.

FIG. 8 is a simplified block diagram of a device 800 that is suitable for implementing example embodiments of the present disclosure. The device 800 may be provided to implement a communication device, for example, the first apparatus 110 or the second apparatus 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 1 to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
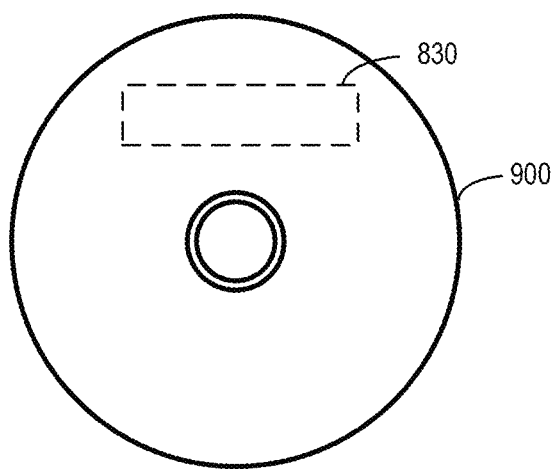
FIG. 9 illustrates a block diagram of an example computer readable medium in accordance with some example embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the foregoing, embodiments of the present disclosure are described for transferring beamlock messages for locking and/or activating beamlocking, in response to which locking and/or activating beamlocking is performed. It should be understood that equivalent embodiments are hereby disclosed for transferring beamlock messages for unlocking and/or deactivating beamlocking, in response to which unlocking and/or deactivating beamlocking is performed. For example, in relation to FIG. 3, an embodiment should be considered disclosed where the first apparatus 110 receives a beamlock message from the second apparatus 120. The beamlock message indicates that one or more Tx beams are to be unlocked on a first list of antenna arrays and/or one or more Rx beams are to be unlocked on a second list of antenna arrays. Based on the beamlock message, the first apparatus 110 then performs unlocking of the one or more Tx beams and/or the one or more Rx beams.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
   at least one processor; and
   at least one memory storing instructions that, when executed by the at least one processor, cause the first apparatus at least to:
   receive a beamlock message from a second apparatus, the beamlock message indicating that one or more transmitting beams are to be locked on a first list of antenna arrays and/or one or more receiving beams are to be locked on a second list of antenna arrays; and
   perform, based on the beamlock message, beamlock of the one or more transmitting beams and/or the one or more receiving beams.

2. The first apparatus of claim 1, wherein the beamlock message includes at least one of:
   a list of array identifications of the first list of antenna arrays to indicate that the one or more transmitting beams are to be locked on the first list of antenna arrays; or
   a list of array identifications of the second list of antenna arrays to indicate that the one or more receiving beams are to be locked on the second list of antenna arrays.

3. The first apparatus of claim 2, wherein the list of array identifications of the first list of antenna arrays or the list of array identifications of the second list of antenna arrays comprises one or more ordered array identifications of the first or second list of antenna arrays, wherein the one or more ordered array identifications indicate a rank of the first or second list of antenna arrays among a plurality of antenna arrays of the first apparatus based on beam measurements.

4. The first apparatus of claim 2, wherein the list of array identifications of the first list of antenna arrays or the list of array identifications of the second list of antenna arrays comprises one or more physical array identifications of the first or second list of antenna arrays.

5. The first apparatus of claim 1, wherein the beamlock message includes at least one of:
   a predetermined array identification for the first list of antenna arrays to indicate that a plurality of transmitting beams is to be locked on a plurality of antenna arrays of the first apparatus; or
   a predetermined array identification for the second list of antenna arrays to indicate that a plurality of receiving beams is to be locked on the plurality of antenna arrays of the first apparatus.

6. The first apparatus of claim 1, wherein the beamlock message includes an indication that a beamlock command for a plurality of beams is activated.

7. The first apparatus of claim 1, wherein the beamlock message is carried via radio resource control signaling.

8. The first apparatus of claim 1, wherein the beamlock message comprises an "Activate Beamlock" message.

9. A first apparatus comprising:
   at least one processor; and
   at least one memory storing instructions that, when executed by the at least one processor, cause the first apparatus at least to:
   receive a beamlock test function command from a second apparatus, the beamlock test function command including:
      a first indication that beamlock is to be activated on at least one antenna array of a plurality of antenna arrays, and
      a second indication that at least one transmitting beam and/or at least one receiving beam is to be locked on the at least one antenna array; and
   perform, based on the beamlock test function command, beamlock of the at least one transmitting beam and/or the at least one receiving beam on the at least one antenna array.

10. The first apparatus of claim 9, wherein the first indication comprises an identification of a target antenna array of the plurality of antenna arrays to indicate that the beamlock is to be activated on the target antenna array.

11. The first apparatus of claim 10, wherein the identification of the target antenna array comprises an ordered array identification of the target antenna array, wherein the ordered array identification indicates a rank of the target antenna array among the plurality of antenna arrays based on beam measurements.

12. The first apparatus of claim 10, wherein the identification of the target antenna array comprises a physical array identification of the target antenna array.

13. The first apparatus of claim 9, wherein the first indication comprises an indication that the beamlock is to be activated on each of the plurality of antenna arrays.

14. The first apparatus of claim 9,
wherein the beamlock test function command includes a third indication that the beamlock test function command is activated; and/or
wherein the beamlock test function command is carried in an "Activate Beamlock" message.

15. A second apparatus comprising:
at least one processor; and
at least one memory storing instructions that, when executed by the at least one processor, cause the second apparatus at least to:
transmit a beamlock message to a first apparatus, the beamlock message indicating that one or more transmitting beams are to be locked on a first list of antenna arrays and/or one or more receiving beams are to be locked on a second list of antenna arrays.

16. The second apparatus of claim 15, wherein the beamlock message includes at least one of:
a list of array identifications of the first list of antenna arrays to indicate that the one or more transmitting beams are to be locked on the first list of antenna arrays; or
a list of array identifications of the second list of antenna arrays to indicate that the one or more receiving beams are to be locked on the second list of antenna arrays.

17. The second apparatus of claim 16, wherein the list of array identifications of the first list of antenna arrays or the list of array identifications of the second list of antenna arrays comprises one or more ordered array identifications of the first or second list of antenna arrays, wherein the one or more ordered array identifications indicate a rank of the first or second list of antenna arrays among a plurality of antenna arrays of the first apparatus based on beam measurements.

18. The second apparatus of claim 16, wherein the list of array identifications of the first list of antenna arrays or the list of array identifications of the second list of antenna arrays comprises one or more physical array identifications of the first or second list of antenna arrays.

19. The second apparatus of claim 16, wherein the beamlock message includes at least one of:
a predetermined array identification for the first list of antenna arrays to indicate that a plurality of transmitting beams is to be locked on a plurality of antenna arrays of the first apparatus; or
a predetermined array identification for the second list of antenna arrays to indicate that a plurality of receiving beams is to be locked on the plurality of antenna arrays of the first apparatus.

20. The second apparatus of claim 16,
wherein the beamlock message includes an indication that a beamlock command for a plurality of beams is activated; and/or
wherein the beamlock message is carried via radio resource control signaling; and/or
wherein the beamlock message comprises an "Activate Beamlock" message.

* * * * *